March 19, 1940.  A. OBERHOFFKEN ET AL  2,193,840
APPARATUS FOR METAL REMOVAL
Filed April 25, 1938  10 Sheets-Sheet 4
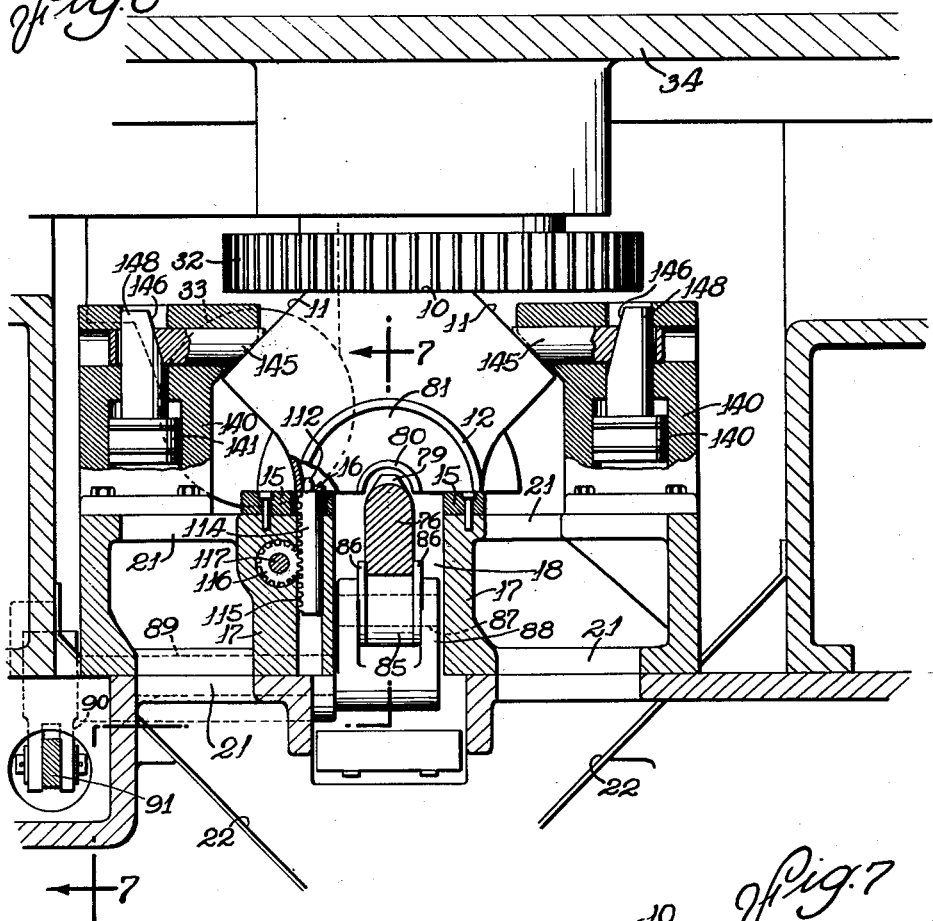
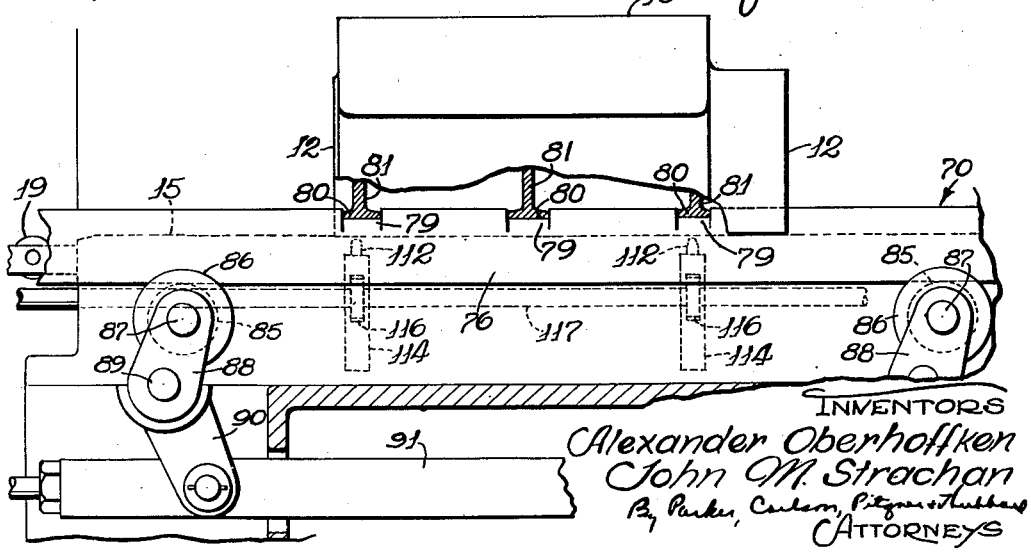

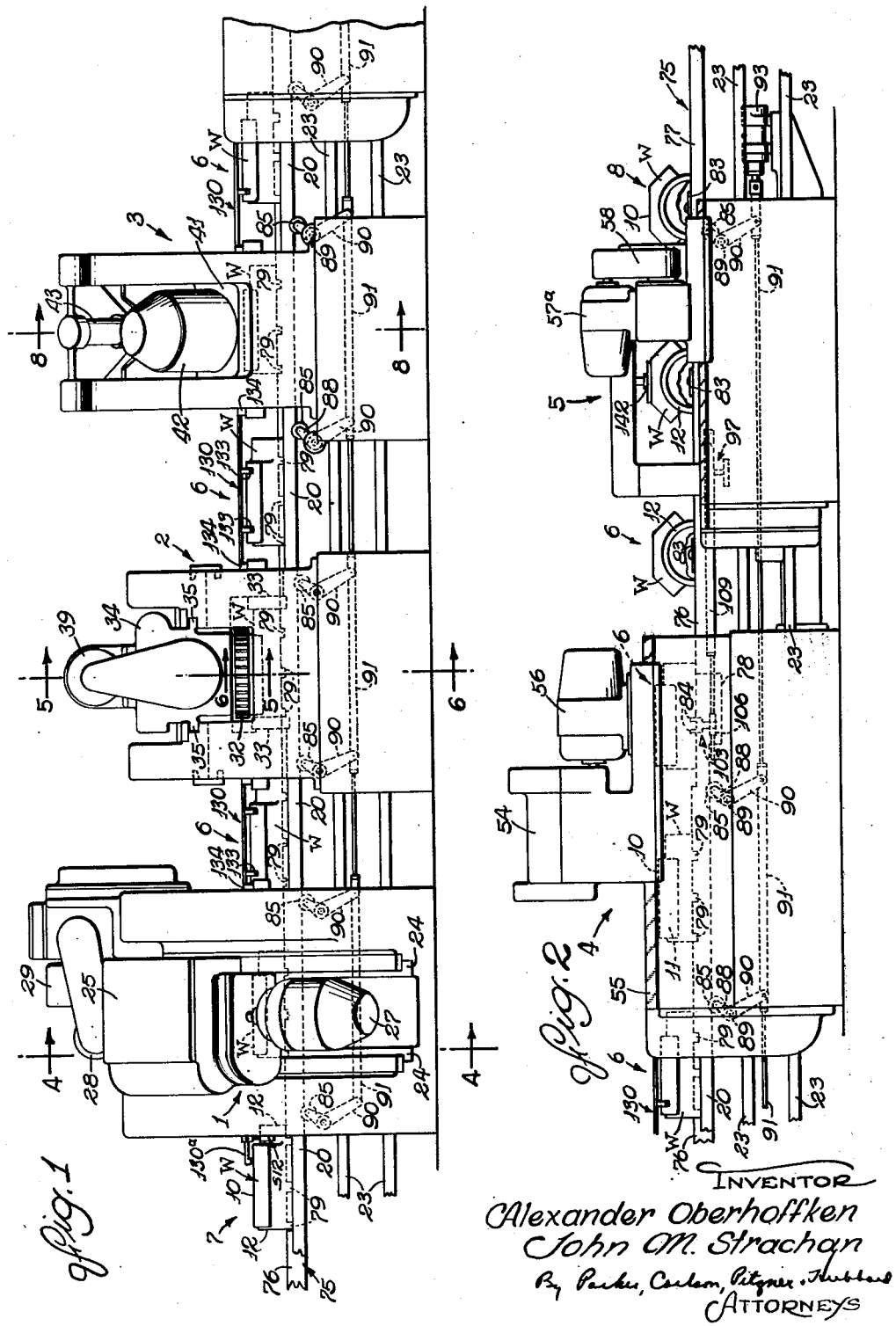

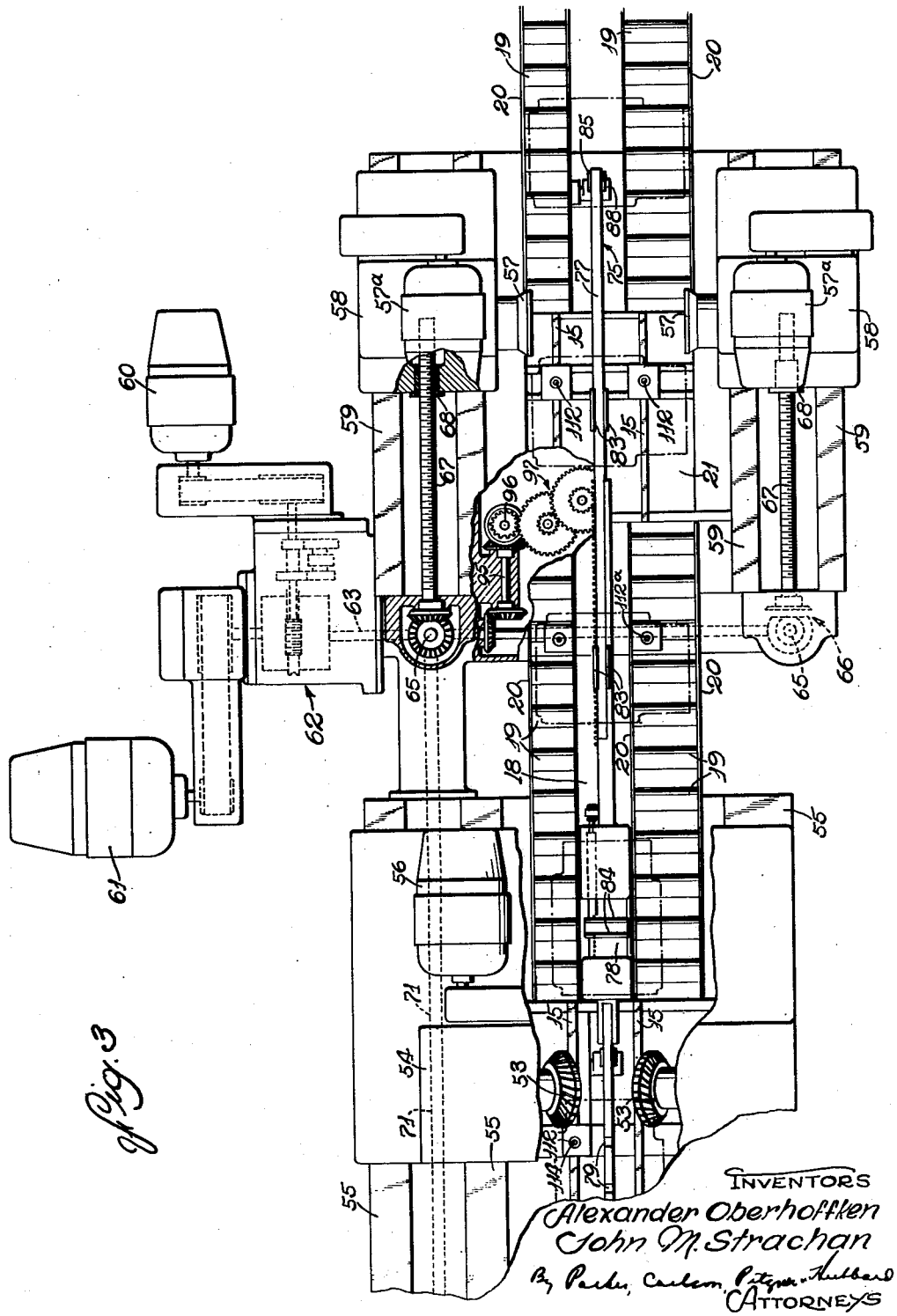

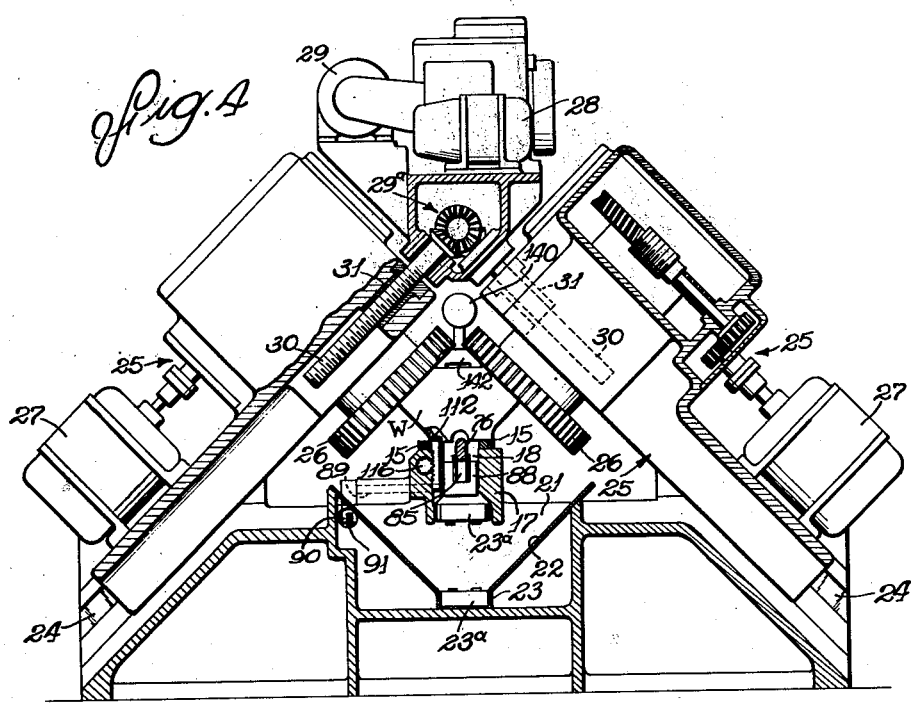

March 19, 1940. A. OBERHOFFKEN ET AL 2,193,840
APPARATUS FOR METAL REMOVAL
Filed April 25, 1938 10 Sheets-Sheet 5
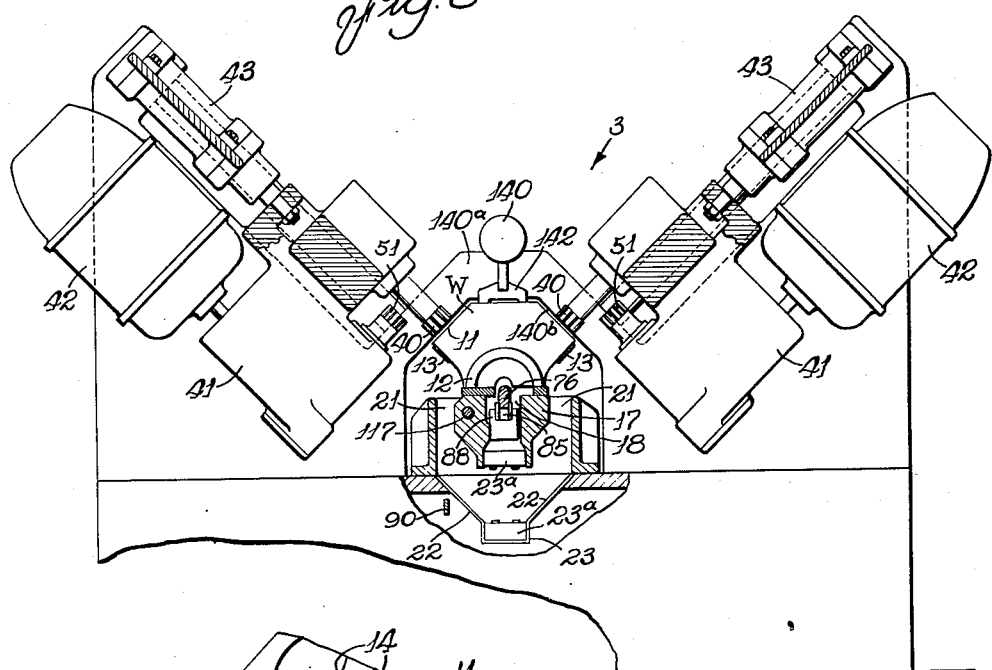

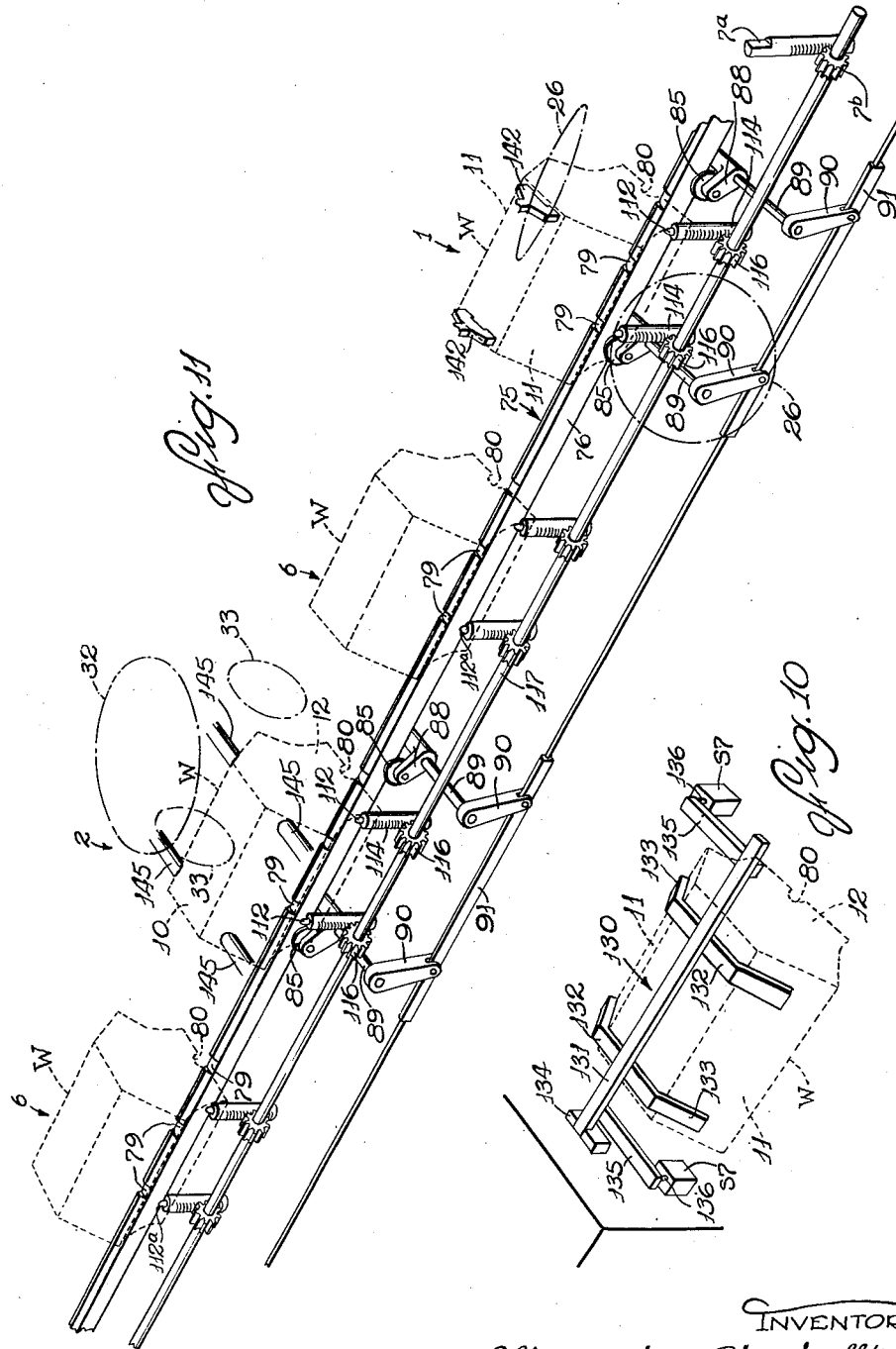

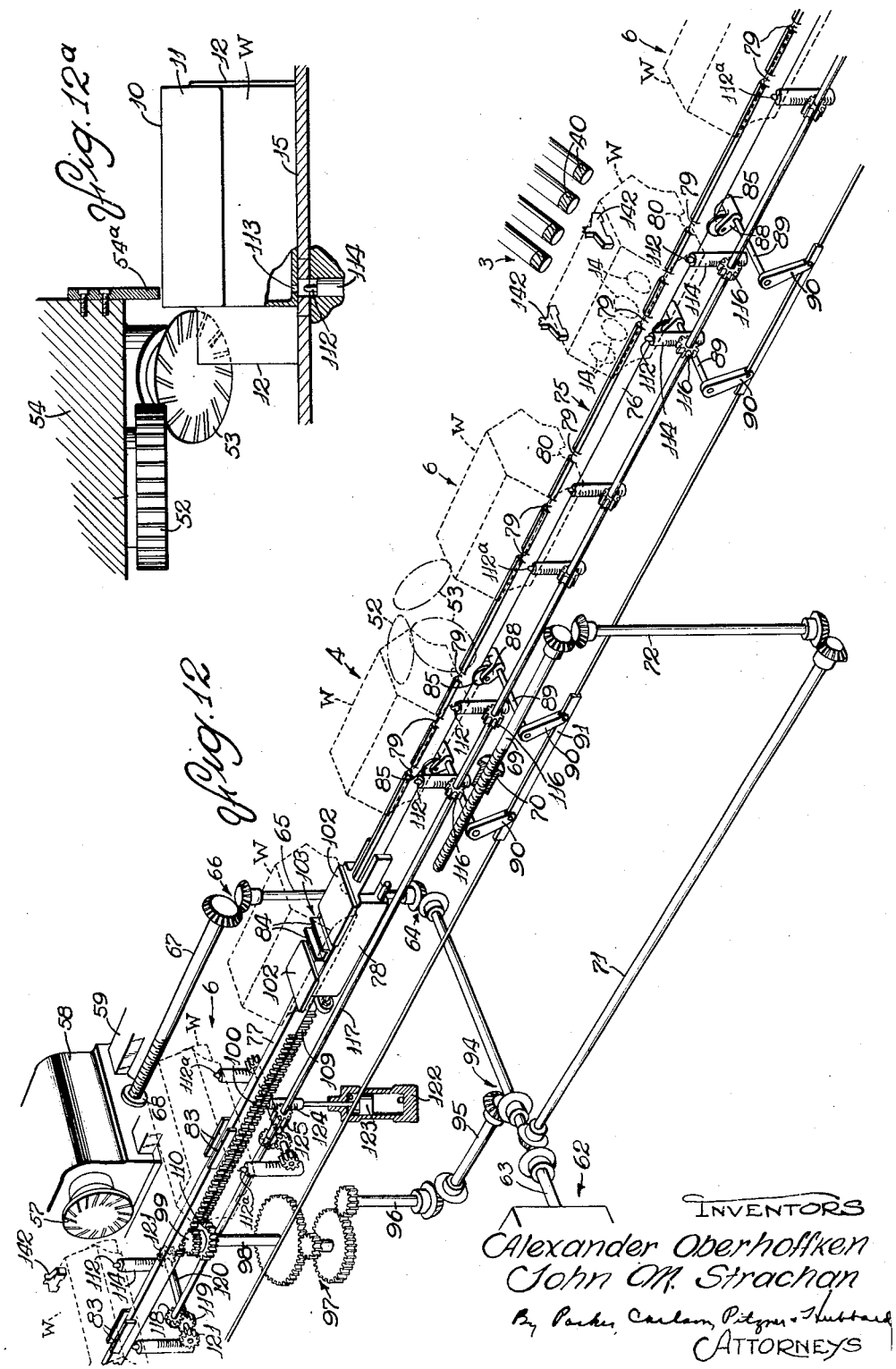

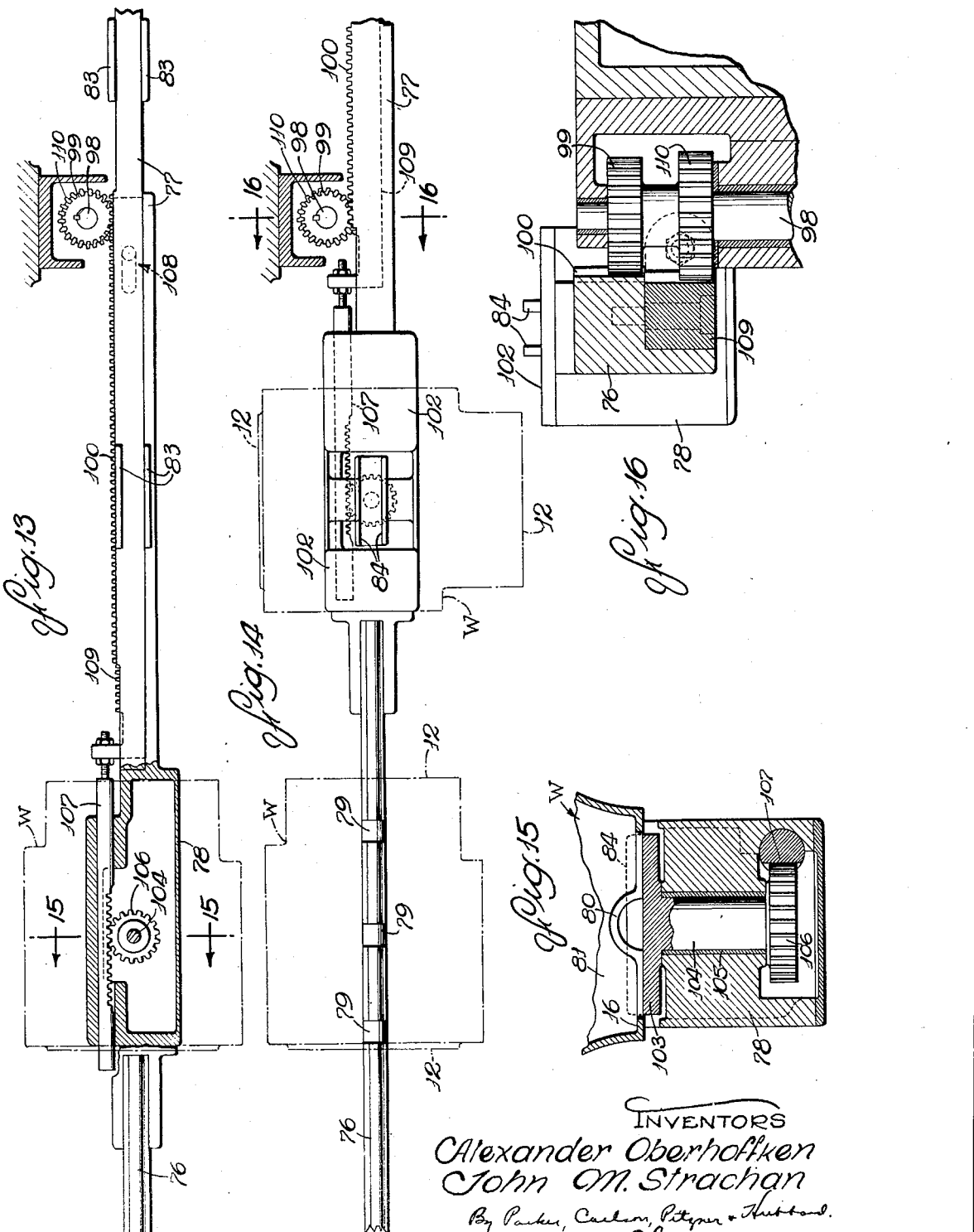

March 19, 1940.	A. OBERHOFFKEN ET AL	2,193,840
APPARATUS FOR METAL REMOVAL
Filed April 25, 1938    10 Sheets-Sheet 9

Patented Mar. 19, 1940

2,193,840

UNITED STATES PATENT OFFICE 2,193,840

APPARATUS FOR METAL REMOVAL

Alexander Oberhoffken and John M. Strachan, Rockford, Ill., assignors to The Ingersoll Milling Machine Company, Rockford, Ill., a corporation of Illinois Application April 25, 1938, Serial No. 204,120

37 Claims. (Cl. 29—33)

This invention relates generally to machine tools and in some of its aspects has more particular reference to organizations in which a series of work pieces are transferred intermittently along a line of work stations in which the work pieces are clamped while different metal-removing operations are performed thereon simultaneously.

One object is to provide an improved machine tool organization of the above general character in which transferring of the work pieces, accurate location, clamping and unclamping thereof, and removal of metal in the successive stations are effected expeditiously in a continuous automatic cycle and in proper timed sequence.

Another object is to increase the speed and accuracy of a production line of the above character in machining work pieces having one or more surfaces of greater length than width.

Another object is to interlock and synchronize in a novel manner the operations of work locating and clamping performed at the different stations.

Still another object is to provide a simple and improved arrangement for synchronizing the operation of the work-transferring mechanism with the movements of the tools at certain of the stations.

A further object is to provide a novel mechanism which operates automatically during the transfer of a work piece from one station to another to turn the work piece and change the position thereof preparatory to another metal-removing operation.

Still another object is to increase the smoothness of a surface machined on a work piece by correlating the movements of a work transferring mechanism and a surfacing tool in a novel manner such as to avoid the necessity of returning the tool across the machined face of the work piece.

The invention also resides in the novel constructions of the work transferring mechanism, the chip-disposing means, and the mechanisms by which the automatic cycle is controlled.

Other objects and advantages of the invention will become apparent from the following detailed description taken in connection with the accompanying drawings, in which Figure 1 is an elevational view of the machines in the first part of the production line.

Fig. 2 is an elevational view of the machines in the remainder of the production line.

Fig. 3 is a fragmentary plan view of that portion of the production line shown in Fig. 2.

Figure 18:
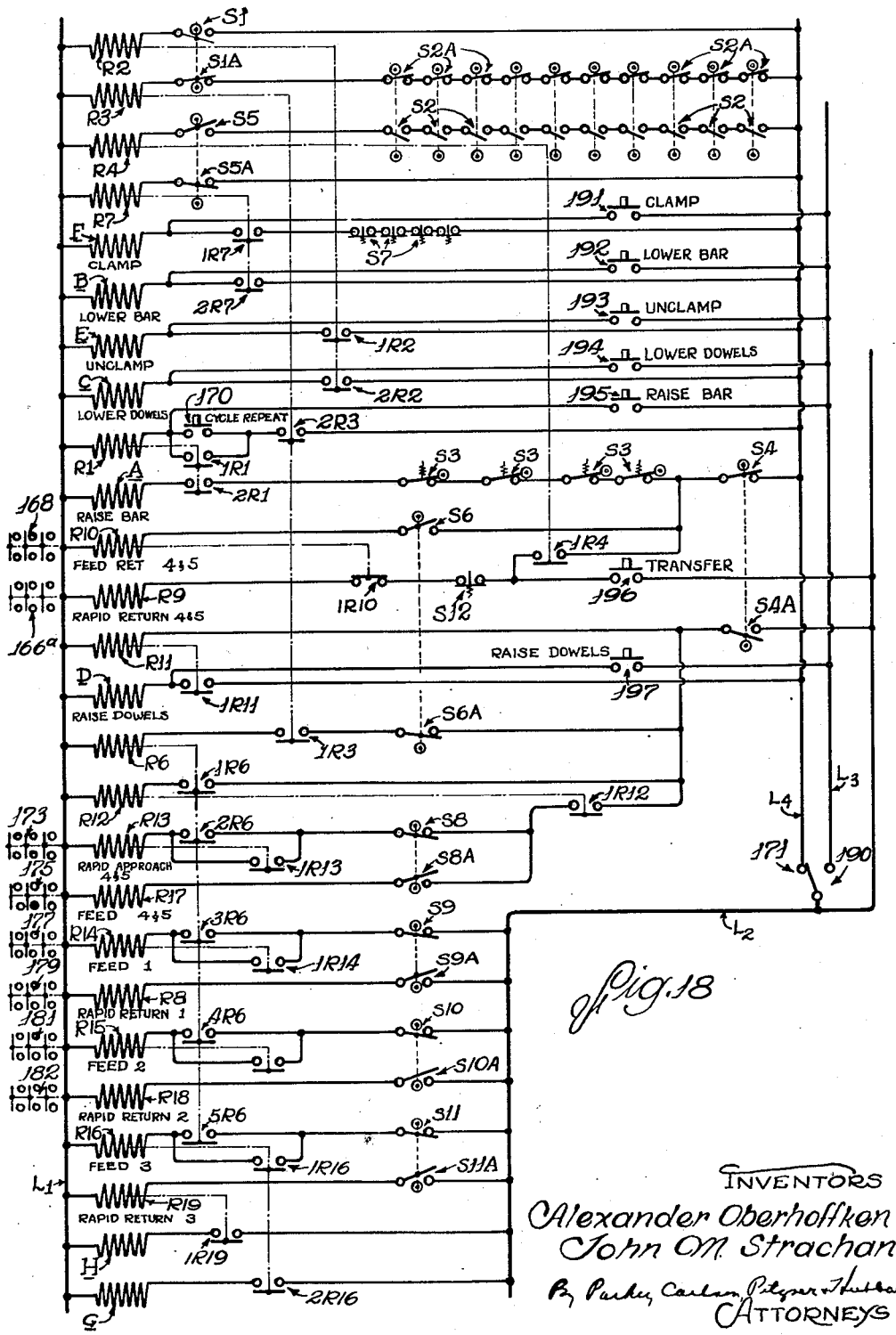

Figs. 4, 5, and 6 are sectional views taken respectively along the lines 4—4, 5—5, and 6—6 of Fig. 1.

Fig. 7 is a fragmentary section taken along the line 7—7 of Fig. 6.

Fig. 8 is a section taken along the line 8—8 of Fig. 1.

Fig. 9 is a perspective view of the clamping mechanism of the machine at the fourth work station.

Fig. 10 is a perspective view of a work feeler.

Fig. 11 is a fragmentary perspective view of the work-locating and transfer mechanisms at the first two work stations.

Fig. 12 is a similar view of the mechanisms at the remaining work stations.

Fig. 12a is a fragmentary longitudinal section of the machine at one of the work stations.

Figs. 13 and 14 are fragmentary plan views of that portion of the work transfer mechanism between the fourth and fifth work stations.

Figs. 15 and 16 are fragmentary sectional views taken along the lines 15—15 and 16—16 of Figs. 13 and 14 respectively.

Fig. 17 is a schematic view and hydraulic circuit diagram.

Fig. 18 is a wiring diagram of the control mechanisms.

For purposes of illustration, the invention has been shown in the drawings as an organization for rough and finish milling the top 10, two side or so-called bank surfaces 11, two end surfaces 12, and three manifold surfaces 13 (Figs. 8 and 9), and for boring the cylinders 14 of blocks W of V-type internal combustion engines. It is to be understood, however, that the invention is not limited to this kind of work piece or to the particular character of metal-removing operations performed thereon, but is intended to cover all modifications and alternative methods, constructions and arrangements falling within the spirit and scope of the appended claims.

The invention in general

The exemplary embodiment of the invention shown involves the performance of a series of roughing and finishing operations on the work pieces W while the latter are held in five separated machines or stations indicated generally at 1, 2, 3, 4, and 5 separated by one or more intervening idle stations 6, and preceded and followed by loading and unloading stations 7 and 8. The work pieces as a group are indexed intermittently along a horizontal conveyor or slideway, being advanced in the present instance endwise into stations 1, 2, 3, and 4 sidewise into station 5. At each station, the work piece comes to rest on a horizontal work support and is accurately doweled in final working position where it is clamped firmly while being machined by one or more cutters carried by individual slidable tool heads. The power actuators for the transfer mechanism, the work locators, the clamps, and the different tool heads are controlled automatically and properly interlocked for synchronous operation in an automatic cycle started by operation of a single control device. As a result, positioning of work pieces on the conveyor at the loading station 7 and removing the finished work pieces at the unloading station 8 are the only manual operations required to be performed.

To enable the production capacity of the line-up as a whole to be increased to a maximum, the invention contemplates a novel method of performing the slowest operations, that is, rough milling the largest surfaces. This method involves rough milling the elongated top and side surfaces 10 and 11 by taking cuts transversely of their length whereby to shorten the feeding movements and therefore the time required for these operations.

Work supports

In each station, the work piece is supported by two horizontal skid plates 15 (Figs. 3, 4, 6, and 8) which engage the underside of the inturned crank case flange 16 on the particular work pieces shown. These plates are mounted on horizontal rails 17 spaced apart to provide a central passage or channel 18. The top surfaces of the plates are alined longitudinally with and at the level of the upper portions of rollers 19 which are arranged in two parallel rows (see Fig. 3) between the skid plates of adjacent work stations. The rollers are rotatably mounted on spaced rails 20 and cooperate with the skid plates to provide a horizontal slideway along which the work pieces may be advanced throughout the length of the line-up.

Chip disposal

As best shown in Figs. 4 and 6, the rails 17 are supported by webs of the machine frames so as to provide chip openings 21 disposed outwardly from the rails. A chute 22 at each station has sides which converge downwardly and deflect chips falling through the channel 18 or the openings 21 into a trough 23 extending throughout the line of machines. An endless power operated conveyor 23a moves the chips along the trough to a point of disposal.

Tool supports and functions

The machines at each work station comprise generally a work support formed by the skid plates 15, one or more tool or cutter heads mounted on the machine frames to slide in a direction determined by the positions of the work surfaces to be machined, and suitable power actuators for the heads which may take various forms well understood in the art. While, in most of the machine tools illustrated, the feed and rapid traverse motions of the tool heads are produced by mechanical drives from electric motors, it will be understood that hydraulic actuators may be used as desired and the cycle control mechanisms changed correspondingly.

The machine at the station 1 operates to rough mill the banks or side surfaces 11 of the work piece. Its frame provides ways 24 (Figs. 1 and 4) inclined upwardly and transversely of the path of travel of the work pieces. Slidable along the ways are tool heads 25 carrying rotary face milling cutters 26 rotated by individual motors 27 on the heads. Herein, the upward feed and downward rapid return movements are imparted to the heads simultaneously by feed and rapid traverse motors 28 and 29 mounted on top of the machine frame and operating through suitable gearing including bevel gears 29a to drive screws 30 threading into nuts 31 on the heads.

At the second station, the top surface 10 is rough milled by a cutter 32 (Figs. 5 and 6) and the end surfaces 12 are rough milled simultaneously by face milling cutters 33 on a head 34 which slides transversely of the work path along horizontal ways 35. Feed and rapid traverse movements are imparted to the head by drive mechanism including a motor 36 operating through a screw 37 and a nut 38. The cutters are driven by a motor 39 on the head.

Boring of the cylinders 14 at the third station is effected by tools 40 (Fig. 8) on spindles projecting from heads 41 mounted on the machine frame to slide along inclined ways and axially of the rough bores. The spindles are driven by motors 42 and feed and rapid return motions are preferably produced by hydraulic motors including cylinders 43 on the machine frame and pistons 44 connected to the heads. Pressure fluid for these hydraulic actuators is supplied by a pump 45 (Fig. 17) driven by an electric motor 46 and fluid flow to opposite ends of the cylinders is controlled by a valve 47 having a movable member 48 shifted in oppositte directions by energization of solenoids G and H. To produce the feed motion, a one-way valve 49 acts to restrict the flow of fluid from the cylinders to the sump 50 when the heads are advancing.

Since the manifold pads 13 are disposed parallel to the axes of the cylinders 14 of the work pieces, face milling cutters 51 are mounted on the heads 41 in positions to mill these pads simultaneously with boring of the cylinders. The cutters on each head for the three pads on each side of the work piece are driven by the motor 42 on the head.

At the fourth station, the top surface 10 and the side surfaces 11 are finish milled simultaneously by face milling cutters 52 and 53 (Figs. 1, 12, 12a, and 17) rotatably mounted in proper positions on a head 54 disposed above the work piece and slidable along horizontal ways 55 longitudinally of the work path. All three cutters are driven by a motor 56.

After leaving the fourth station, the work piece is, for a purpose to appear later, turned about a vertical axis through a quarter revolution and advanced sidewise into the fifth station where the end surfaces 12 are finish milled by cutters 57 on heads 58 disposed on opposite sides of the machine frame and mounted on horizontal ways 59 to slide longitudinally of the work path. Each cutter 57 is driven by a motor 57a.

To reduce the amount of power equipment required, the head 54 and the heads 58 of the machines 4 and 5 are actuated by a common operator which herein comprises feed and rapid traverse motors 60 and 61 operating through appropriate differential drive mechanism indicated at 62 (Fig. 3) to a horizontal cross shaft 63. Power is transmitted from this shaft through bevel gears 64, vertical shafts 65, and bevel gears 66 to screws 67 which thread into nuts 68 on the heads 58 of the fifth station. A screw 69 (Fig. 12) threading into a nut 70 on the head 54 at the fourth station is driven from the shaft 63 through horizontal and vertical shafts 71 and 72 and connecting bevel gearing. With this arrangement, the cutter heads 54 and 58 of the fourth and fifth stations are fed reversely, that is, to the left as viewed in Fig. 3 to the direction of the work advance along the production line and are rapid returned in such direction. By varying the drive ratios of the gearing in the motion-transmitting connections from the common drive shaft 63 to the respective heads 54 and 58, strokes of the proper lengths may be imparted to the latter.

Each of the milling cutters is formed of a diameter greater than the width of the work surface operated thereon measured in the direction of cutter feed. Thus, the cutters 26 and 32 are larger than the lengths of the side and top surfaces of the work pieces while the cutters 53 and 52 which finish these surfaces are only slightly larger than the widths of the surfaces. Of course, all of the heads are constructed and mounted so as to dispose the active faces of the cutters in the planes of the surfaces to be milled when the work pieces are properly located and clamped at the different stations.

Work transfer mechanism

The power actuated transfer mechanism for indexing the work pieces step-by-step to advance each piece successively through the five work stations and intervening idle stations comprises an elongated shuttle 75 extending throughout the length of the production line and reciprocable longitudinally in the channel 18 between the skid plates 15. In the present instance, the shuttle comprises a long bar 76 and a short bar 77 arranged in end-to-end relation with their adjacent ends rigidly connected between work stations 4 and 5. The trailing end of the short bar 77 is rigid with a casting 78 (Figs. 3, 12, and 13) and the forward end of the long bar 76 is fastened to the yoked end of the casting. The upper surface of the bar 76 is formed along its upper edge with groups of three squared notches 79 spaced along the bar to correspond to the spacing of the adjacent work and idle stations. The notches of each group are shaped to receive semi-circular flanges 80 (Fig. 7) at the lower edges of the end walls and intermediate cross web 81 of the engine block, the flanges defining the recesses in which the crank shaft bearings of the block are mounted. The bottoms of the notches are rounded to conform closely to the shape of the recesses in the flanges 80. It will be seen that when the transfer bar 76 is raised to the position shown in Fig. 7 with the flanges 80 seated in the three notches 79, the engaged engine block will be coupled to the bar and held positively against any substantial movement relative to the bar either laterally or longitudinally of the latter. By employing three notches as shown, the block will be received in the bar in only one predetermined longitudinal position. When the bar is lowered as shown in Fig. 6, the upstanding walls of the notches 79 are disposed below the flanges 80 and the bar may be shifted endwise while the work pieces rest on the conveyor.

At correspondingly spaced points along its length, the short bar 77 is equipped with pairs of upstanding plates 83 and 84 spaced along the bar to correspond to the spacing of the last two idle and last work station. The plates of each pair are spaced apart a distance equal to the width of the flange 80 on the web 81 of the work piece. The plates are of a length corresponding to the spacing of the sides of the crank case flange 16. Thus, when the shuttle is raised, the plates receive the webs 81 of the associated blocks and positively couple the latter to the bar 77.

To enable the shuttle to be utilized in the manner described above in holding the work pieces positively against lateral or endwise displacement while the pieces are being transferred from station to station, the shuttle 75 is mounted for bodily vertical movement between lower and upper positions shown in Figs. 6 and 7. For this purpose, the bars 76 and 77 rest upon rollers 85 between guide flanges 86 thereon, which rollers are rotatable on pins 87 carried by yokes 88. The latter are fast on rock shafts 89 journaled in the machine beds and carrying depending cranks 90 pivotally connected at their free ends by an actuator rod 91. It will be seen that the shuttle and its supporting parts are constructed and arranged so that chips dropping thereon will fall off readily and will not interfere with proper movements of the parts.

One end of the rod 91 is connected to a piston 92 reciprocable in a stationary cylinder 93 (Figs. 2 and 17). The flow of fluid from the pump 45 to opposite ends of the cylinder is controlled by a valve 93ª having a movable member 93ᵇ which is shifted in response to energization of solenoids A and B. During one stroke of the piston resulting from energization of the solenoid A, the rod 91 is shifted to the right as viewed in Fig. 2 thereby raising the bars 76 and 77 into engagement with the work pieces at all of the work, idle, and loading stations. While thus held in elevated position, the shuttle may be shifted endwise along the rollers 85 thereby advancing a work piece out of each work station and the preceding piece into the station. In the reverse stroke of the actuator caused by energization of the solenoid B, the rollers 85 are lowered to the position thereby disconnecting the shuttle from all of the work pieces so as to permit idle retraction thereof.

To reduce the amount of power equipment required and to synchronize the movements of the transfer mechanism with cutters at the finishing stations 4 and 5 for a purpose to be described presently, the transfer bars 76 and 77 are preferably reciprocated in unison with machines 4 and 5 and by power derived from the actuator for these heads. For this purpose, a connection is extended from the drive shaft 63 through bevel gears 94, intermediate shafts 95 and 96, and gearing 97 to a shaft 98 carrying a pinion 99. The latter meshes with rack teeth 100 formed along the transfer bar 77. As shown in Fig. 16, the teeth are of a length such as to mesh with the pinion in both the raised and lowered positions of the bar.

The gearing arrangement is such that the active stroke of the transfer shuttle 75 to advance the work pieces occurs while the cutter heads 54 and 58 are being rapid returned, that is, moved in the direction of work advance. Conversely, the shuttle 75 is retracted idly during the active or cutting stroke during which the heads 54 and 58 are fed in a direction opposite to the direction of advance of the work pieces. The drive connection is also of such character that the transfer bars are advanced a greater distance than the tool heads in each stroke of the latter, the distance corresponding to the spacing of the adjacent work and idle stations of the line-up.

As will appear later, the active stroke of the cutter heads 54 continues until the cutters 53 and 54 have passed beyond and out of engagement with the trailing end portions of the work surfaces milled thereby. Because of this and the fact that these cutter heads are rapid returned at a rate not exceeding the rate of advance of the work pieces by the transfer bars, the cutters, 53, 54, and 57 never contact the finished work surfaces. Any possibility of marring these surfaces such as might occur by rapidly returning the cutters thereacross is effectually avoided. Such synchronization of the cutter heads and the transfer bar not only contributes to an improved finish on the work but also speeds up production by the line-up as a whole since it is unnecessary to delay the cycle by awaiting return of the cutter heads 54 and 58 to starting position.

Work turning mechanism

To permit the end surfaces 12 of the work pieces to be finish milled without the necessity of returning the cutters across the finished surface, the work pieces in station 5 must be disposed with their end surfaces extending parallel to the direction of feed of the cutters 57 and of work transfer. This involves turning of the work piece around a central vertical axis through a quarter of a revolution from the position it occupies when indexed out of station 4. Such a change in position is effected by power actuated mechanism which operates while the piece is disposed between stations 4 and 5 and preferably during transfer of the piece between the two idle stations provided between these work stations.

Referring to Figs. 3 and 12 to 16, the turn around mechanism includes two spaced horizontal plates 102 secured to the top of the casting 78 of the transfer shuttle and providing a skid surface for supporting each work piece while it is being turned. Disposed between the plates is a turn table 103 having the two parallel plates 84 previously referred to upstanding therefrom and spaced to receive the central web 81 of a work piece as shown in Fig. 15 when the transfer shuttle is raised. The table is rigid with the upper end of a shaft 104 journaled in a bushing 105 in the casting 78 and having a gear 106 on its lower end. A rack 107 extending parallel to the transfer bar 76 and slidable in the casting 78 meshes with the gear 106 so that the table 103 will be turned in one direction or the other depending on the direction of movement of the rack relative to the casting.

The projecting end of the rack 107 is attached adjustably (see Fig. 13) to one end of a rack bar 109 having a pin and slot connection 108 at its opposite end with the transfer bar 76 so as to permit of a limited degree of relative sliding movement between the rack bars 77 and 109. Fast on the shaft 98 and meshing with the teeth of the rack bar 109 is a pinion 110 having a number of teeth larger than the pinion 99. The rack teeth are of sufficient width to remain in mesh with the pinion during raising and lowering of the transfer bar 77. During rotation of the shaft 98 to reciprocate the transfer shuttle, the two racks 77 and 109 will be advanced at different speeds corresponding to the numbers of teeth on the pinions 99 and 100. The difference is such that during the predetermined advance of the transfer shuttle during which each work piece is advanced from one station to the next, the table 103 will be turned through a quarter revolution. Thus, when the transfer shuttle is retracted (Fig. 3), the turn table will be disposed in the first idle station 6 beyond the work station 4 and the plates 84 will extend perpendicular to the work path, being thus positioned to receive the central web 81 of the engine block at this idle station when the transfer shuttle is elevated. In the advanced position of the shuttle (Fig. 14), the turn table will be disposed at the next idle station 6 with the flanges 84 extending parallel to the work path, the block at this station having been turned horizontally about the turn table axis through a quarter revolution. As a result of this arrangement, it will be observed that in each advance of the shuttle, work pieces are advanced endwise into the work stations 1, 2, 3, and 4 and the adjacent idle stations, and sidewise into the fifth work station, and the preceding idle station 6, and the unloading station 8.

To increase the accuracy with which the work pieces are positioned as they come to rest in the different stations, provision is made for slowing down the final advancing movement of the transfer shuttle. While such deceleration may be effected in different ways, it may be accomplished simply and conveniently in the present instance by reducing the speed of the transfer shuttle from the rapid traverse rate to the feed rate of the cutter heads 54 and 58. The control mechanism employed for this purpose will be described later.

Work locating

In the present instance, final accurate positioning of the work pieces at the different stations preparatory to clamping and machining is effected by pairs of vertically movable dowel pins 112 adapted to enter accurately rigid and spaced holes 113 (Figs. 3 and 12a) previously drilled in the crank case flange 16 and spaced along one side of the latter. The pins are rigid with and project from the upper ends of plungers 114 slidably mounted in the bed portions 17. The upper ends of the pins are tapered as shown so that the pins of each pair will enter the holes 113 of an approximately positioned work piece and cam the same horizontally into an accurately defined position as the pins become fully entered.

Preferably, though not necessarily, dowel pins 112a are provided at the first three and the last idle stations 6 for the purpose of maintaining the work pieces at these stations against displacement from their normal positions either accidentally or by vibration. These dowels are of the same construction and are mounted on the machine framework in the same manner as the dowels 112.

To obtain accurate synchronism in the operation of the different power actuators at the different work stations, provision is made for interlocking the movements of all dowel pins 112 and 112a. This is accomplished simply and positively in the present instance by interconnecting the dowels mechanically and actuating the same by a common power operator. For this purpose, each of the dowel pins is formed with rack teeth 115 meshing with a gear 116. The gears at the first four work stations are fast on a long rock shaft 117 suitably journaled in the machine frames. At station 5, the shaft 117 carries a gear 118 (Fig. 12) meshing with a gear 119 on a cross-shaft 120 which carries the actuating gears 121 for the dowel pins which, at the last idle station and the fifth station, are spaced transversely of the work path to correspond to the changed position of the work piece in these stations. By rocking the shaft 117 counter-clockwise as viewed in Figs. 6 and 12, it will be observed that the dowel pins will be projected upwardly and, by engagement of their tapered upper ends with the walls of the dowel recesses 113, will shift the work pieces laterally as may be required in order to permit of full entry of the dowels to the position shown in Fig. 6. The work pieces are thus accurately positioned on their supports.

In the present instance, the operator for rocking the dowel actuator shaft 117 comprises a cylinder 122 and piston 123, the latter being on a rod carrying a rack 124 meshing with a pinion 125 on the shaft 117. Pressure fluid from the pump 45 is admitted to opposite ends of the cylinder by a valve 126 having a member 127 shiftable by solenoids C and D. The dowel pins are respectively raised and lowered by energization of the solenoids D and C.

Due to removal of partially machined work pieces from the production line for purposes of inspection and improper replacement thereof or for other causes, work pieces may become so displaced from their normal positions at certain of the stations that they cannot be engaged properly by the transfer shuttle or by the dowel pins 112ᵃ. Serious damage might result from operation of the power actuators through a complete cycle under such conditions. To avoid this possibility, means is provided for detecting a misplaced work piece at certain of the stations, for example, the first three idle stations 6. Herein, this means comprises a mechanical feeler indicated generally at 130 (Figs. 1 and 10) and including a horizontal bar 131 rigidly connected to cross-bars 132 having projecting arms 133 which fit around the side surfaces 11 of an engine block positioned immediately beneath the cross-bars. The bar is guided at opposite ends for vertical movement by blocks 134 on frames of the adjacent machines and is supported at opposite ends by lateral arms 135 resting on pins 136 upstanding from the casings of spring-opened switches S7 (Fig. 18) which are normally held closed by the weight of the feeler 130. This condition will prevail whenever there is no work piece in the idle station or when the piece therein is correctly positioned as shown in Fig. 10. Shifting of any portion of the block laterally or raising of any portion due to failure of the work flanges 80 to enter the notches 79 when the transfer bar is elevated will raise one end or the other of the feeler and cause one of the switches S7 to open.

The opening of either feeler switch at any of the selected idle stations constitutes an indication that a work piece is positioned improperly. Such indication is utilized through the medium of electrical control circuits later to be described to disable the power actuated clamping mechanism thereby interrupting the cycle of operation of the production line.

A feeler 130ᵃ (Fig. 1) is mounted on the frame of machine 1 and overlies each work piece as it is moved into the loading station 7. A normally closed switch S12 is associated with this feeler and arranged to be opened in response to raising of the work piece in the event that the work piece is incorrectly positioned longitudinally of the slideway when the transfer bar 76 is raised. Correct longitudinal positioning of the work piece is determined by a retractible stop 7ᵃ (Fig. 11) disposed in the path of the work piece shifted along the work slideway into the loading station. This stop is mounted similar to the dowel pins 112 and 112ᵃ for vertical movement, being held in raised position in the path of the work pieces while the dowel pins are elevated during which time a new work piece is moved into the loading station 7 against the stop and between suitable side rails. A pinion 7ᵇ meshing with rack teeth on the stop lowers the latter out of the work path when the shaft 117 is rocked in a direction to retract the dowels.

*Work clamping*

After accurate positioning of the work pieces in the different stations by full entry of the associated dowel pins 112 and 112ᵃ, each work piece at the work stations is firmly clamped in place and so held during operation of the cutters thereon. The clamping members at the different work stations are differently shaped according to the portion of the work engaged thereby, and each member is operated by an hydraulic actuator comprising stationary cylinder 140 and a movable piston 141.

At first, third, and fifth stations, the clamping members (Figs. 4, 8, and 17) comprise vertically movable shoes 142 engageable with the top surface 10 of the engine block. These shoes are acted on by cams 143 on the projecting ends of the rods 144 of the pistons 141 at these stations. As shown in Fig. 6, horizontally slidable plungers 145 are pressed against the side surfaces 11 of the work piece at the second station. These are actuated by cam surfaces 146 on the ends of rods 148 projecting upwardly from pistons 141.

Since the top 10 and side surfaces 11 are finish milled simultaneously, the clamps at the fourth station comprise pins 149 (Fig. 9) adapted to be projected into the manifold holes 150 and to press downwardly on the block. These pins are on the ends of bars 151 fulcrumed intermediate their ends between lugs 152 and having follower lugs 153 near their other ends bearing against a cam plate 154. Pins 154ᵃ on the latter ends ride in cam slots 155 on the plate. The cam plates on opposite sides of the block are carried by the rods 156 of the clamping piston at the fourth work station. During movement of the rods 156 to the right as viewed in Fig. 9, the bars 151 are first shifted endwise to project the pins 149 into the holes 150. In the further movement, inclined surfaces 157 on the plates 154 operate on the lugs 153 to rock the bars about the fulcrum 152 and thereby press the pins 149 downwardly against the side walls of the holes 150, the work piece being then clamped against its supporting skid plates.

Pressure fluid from the pump 45 is admitted to opposite ends of the cylinders 140 of the different machines to apply and release all of the clamping members. The fluid flow to the clamping and unclamping ends of the cylinders is through conduits 158 and 159 respectively, and such flow is controlled by a valve 160 having a member 161 which is shifted in a direction to actuate all of the clamps when a solenoid F is energized. When a solenoid E is energized, reverse movement of the valve member occurs and fluid is admitted to the unclamping ends of the cylinders whereby to release all of the clamps.

By applying the clamping forces through the medium of cam actuators as above described, it will be apparent that each piston 141 will always move through a predetermined range in effecting clamping of the associated work piece when the latter is positioned correctly. If, however, the piece is misplaced and not resting properly on its skid plates, free movement of one of the pistons will be prevented. Such movement of a clamping member short of its normal range or failure of the member to move are utilized in a manner later to be described to indicate improper clamping of the work piece and to interrupt the operating cycle of the entire line-up.

The present method of handling and machining the work pieces is conducive to the formation of finished top, side, and end surfaces which are more accurate and substantially flatter than those heretofore obtained in the face milling of engine blocks. This increased accuracy is attributable in part to the fact that the work pieces are held in place during finish milling by a clamping pressure substantially less than that required to hold the piece properly during rough milling and insufficient to cause any substantial distortion of the pieces. The application of such a light clamping pressure may be effected in various ways. For example, the cylinders 140 and the pistons 141 at the stations 4 and 5 may, as shown in Fig. 17, be made smaller than the cylinders at the roughing stations so as to produce the desired differential clamping pressure while permitting all of the cylinders to be supplied with fluid from the common source.

As a safety provision to be described later, means is provided at each work station which operates during elevation of the dowel pins 112 to prevent raising of a work piece thereby in the event that the piece is misplaced or a dowel hole 113 is blocked. This means comprises one or more positive stops overlying some part of the work piece. For example, the clamping shoes 142 and 154 at stations 1 and 2 and the similar shoes at the fifth station may be mounted with small clearance relative to the work piece so as to block the piece and limit any upward movement of the work piece to a small range less than the normal range of movement of the dowels during entry thereof. Or a portion of each machine frame may overlie and be spaced close to a work piece in operating position therein. Thus, in the machine 3, the webs 140ᵃ at opposite ends of the machine frame may have lower surfaces 140ᵇ conforming to the contour of the top of the work piece and spaced sufficiently close thereto to prevent any substantial raising of the work piece in the event that the latter is positioned to interfere with the normal raising of the dowel pins 112. At the fourth station, a bracket 54ᵃ is secured to the forward end of the head 54 so as to overlie the work piece and thus block the latter against upward movement. Since the dowel pins 112 are interlocked mechanically, it will be seen that if any dowel pin 112 is blocked at the time when the dowel actuator operates to enter the dowels, one of the stops above referred to will become effective to limit the movements of all of the dowels and thus prevent movement through their full normal range. As will be described later, this abnormal condition is utilized to disable all of the machines against further functioning.

*Control mechanism and normal operation thereof*

The power actuators for the tool heads, the work clamps, the dowel pins, and the work transfer shuttle are controlled electrically in the present instance by the circuit arrangement shown in Fig. 18. The control involves the use of relays R1 to R19 which control the energization of the valve control solenoids A to H previously referred to and the operation of the various feed and rapid traverse motors for driving the milling heads 25, 34, 54, and 58. The circuits for these relays and solenoids extend between power lines L1 and L2 and are controlled by groups of switches actuated manually or automatically in response to movements of the various parts as will be described in the following description of a normal operating cycle.

To simplify the description and facilitate tracing of the circuits, a special circuit diagram and system of reference numbers has been adopted. As will be seen in Fig. 18, the relay switches actuated by the different relays R1 to R19 are arranged in vertical rows and connected to each other and the respective relay coils by dot-dash lines. Each relay switch is designated by a prefix number added to the relay number. For example, the fourth switch actuated by the relay R6 is numbered 4R6. Where two switches are connected together and reversely actuated by a common control dog, the second switch is designated by the letter A added to the number of the first switch. For example, switches S2 and S2A constitute one pair of such switches.

Briefly, a normal operating cycle comprises the following steps assuming that the cutter heads at work stations 1, 2, and 3 have returned to starting position while the cutter heads at work stations 4 and 5 are advanced to the ends of their cutting strokes:

1. Raising of the work transfer shuttle in response to manual closure of a cycle start switch 170.
2. Release of the clamps at all work stations.
3. Retraction of all dowel pins.
4. Rapid return of the cutter heads at stations 4 and 5 and simultaneous advance of the transfer shuttle.
5. Entry of dowel pins to locate the work pieces at the five work stations and the four idle stations.
6. Clamping of work pieces.
7. Lowering of work transfer shuttle.
8. Advance of all cutter heads and rapid returns of cutter heads at stations 1, 2, and 3.

Now considering the steps of the operating cycle more in detail, the various power actuated and control parts will, under the starting condition above assumed, be conditioned as shown in Figs. 17 and 18. At this time, the work pieces at all stations will be clamped, the transfer shuttle 75 will be lowered and fully retracted to the left as viewed in Figs. 1, 2, and 17, and the dowel pins 112 and 112ᵃ will be raised by virtue of the energized condition of the solenoids F, B, and D. The control mechanism is normally conditioned for execution of an automatic cycle by manual closure of a switch 171 which connects the power line L2 to the line L4.

After a new work piece has been placed on the work conveyor track in the proper position against the stop 7ᵃ at the loading station, the operator depresses the push button switch 170. This completes an energizing circuit for the relay R1 between the lines L1 and L4 through a switch 2R3 which is held closed at this time by the relay R3. Energization of the latter is through a circuit including a switch S1A which is held closed by a dog 162 on the actuator bar 91 when the latter is retracted to lower the transfer shuttle 75. The relay circuit also includes a plurality of switches S2A, one associated with each work clamp and arranged to be actuated and closed by a dog 163 as the clamping member approaches engagement with the work, the switch being opened when the clamp is released. Whenever the switches S2A are closed, the companion switches S2 are open.

When the relay R1 is energized, it locks in by closure of its switch 1R1 and closes a second switch 2R1 which completes a circuit through the solenoid A. Closure of this circuit is conditioned upon all of the tool heads 25, 34, and 41 at the first three stations being fully returned and the heads 54 and 58 at the last two stations being fully advanced, that is, at the ends of their cutting stroke. The first condition is evidenced by closure of a plurality of spring opened switches S3 which are closed by dogs 164 on the cutter heads 25, 34, and the two heads 41 at the first three work stations as these heads are returned to starting position. The second condition is evidenced by closure of a switch S4 which is held closed by a dog 165 on the cutter head 58 of the fifth machine when this head is in advanced position. Energization of the solenoid A shifts the valve 93ª to direct pressure fluid into the left hand end (Fig. 17) of the cylinder 92 and thus initiates movement of the piston 93 and rod 91 to the right to operate the bell cranks and raise the rollers 85 supporting the transfer shuttle 75. Each group of notches 79 in the bar 76 and the pairs of plates 83 and 84 associated with the bar 77 thus receive the flanges 80 of the work pieces at the different loading, idle, and work stations thereby coupling all of the blocks and the shuttle together.

The second step of the cycle, that is, unclamping of all the work pieces occurs in response to the final upward movement of the transfer shuttle during which a dog 166 closes the switch S1 and opens the companion switch S1A. The relay R2 is energized by closure of the switch S1 and operates to close its switches 1R2 and 2R2, the former of which completes the energizing circuit for the unclamping solenoid E. The valve 160 is thus shifted to admit pressure fluid to the head ends of all of the cylinders 140 causing retraction of the clamping members from all of the work pieces. As an incident to this, the switches S2 are closed and the companion switches S2A are opened.

Closure of the switch 2R2 completes a circuit for a solenoid C and energization of the latter shifts the valve 126 to admit pressure fluid into the top of a cylinder 122 thus causing the piston 123 to move downward and retract the dowel pins 112 and 112ª and the loading stop 7ª simultaneously with unclamping of the work. In the final downward movement of the dowels, a switch S5 is closed and an associated switch S5A is opened by a dog 165ª. Closure of the former completes a circuit for the relay R4 through the switches S2 which normally will all be closed due to the released condition of all of the clamps. When energized, the relay R4 closes a switch 1R4 which completes a circuit extending from the line L1 through the relay R9, a then closed switch 1R10, a switch S12 which is closed if the work piece at the loading station is positioned correctly, the switch 1R4, and the switch S4 which is then held closed by the tool head 58. Energization of the latter relay closes a multi-point contactor 166ª which initiates operation of the motor 61 in a direction to rapid return the tool heads 54 and 58 of machines 4 and 5 and advance the transfer shuttle 75 at a corresponding rate. The work pieces at all of the stations are thus indexed forwardly in the fourth step of the automatic cycle.

Near the end of the rapid return movement of the head 54 and as the transfer shuttle 75 approaches its most advanced position, a switch S6 is actuated by a dog 167 on this head to complete a circuit for the relay R10 through the switch S4. Energization of the relay R10 opens the switch 1R10 which breaks the circuit to the relay R9 to interrupt the rapid movement of the heads 54 and 58 and the shuttle 75. A switch 168 is also closed by the relay R10 to complete the circuit to the feed motor 60 which continues to return the head at a slow rate. This movement continues until the relay R10 is deenergized which occurs when the switch S4 is opened by a dog 169 as the cutter head 58 reaches its starting position. Such deceleration of the transfer shuttle to the feed speed of the tool heads increases the accuracy with which the shuttle is stopped and the work pieces located at the different stations.

Opening of the switch S4 in the final advance of the work pieces interrupts the circuit of the solenoid A and simultaneous closure of a switch S4A completes a circuit through the relay R11. When energized, this relay closes a switch 1R11 which completes a circuit for the solenoid D, initiating the fifth step of the cycle. Energization of the solenoid D shifts the valve 126 to admit pressure fluid to the lower end of the cylinder 122 thereby causing the mechanically connected dowel pins 112 and 112ª and the stop 7ª at the different stations to be raised simultaneously. In this movement, the tapered upper ends of all of the pins normally will enter the corresponding holes 113 in the work pieces and will shift the latter laterally as may be required in order to permit full entry of the dowels. The work pieces at the work and idle stations thus become doweled into accurately determined positions on their respective supports in which positions they are held during performance of the machining operations thereon.

Such final positioning of the work pieces as evidenced by raising of the dowel pins to a predetermined limit position initiates operation of the work clamps and the sixth step of the cycle. This occurs in response to closure of a switch S5A by a dog 172 (Fig. 17) in the final movement of the dowel pins, the companion switch S5 being opened simultaneously to deenergize the relay R4. Closure of the switch S5A energizes the relay R7 which in turn closes switches 1R7 and 2R7 respectively completing energizing circuits for the solenoids F and B. Included in the circuit for the former are the switches S7 which as above described are controlled by the feelers 130 (Fig. 18) for detecting the presence of incorrectly positioned work pieces at the first three idle stations 6. All of these switches are closed when, as is normally the case, the work pieces at the selected stations are correctly positioned. Energization of the solenoid F shifts the valve member 161 to the right (Fig. 17) thereby directing pressure fluid into the head end of each clamping cylinder 140. The clamping members at each work station are thus applied to the work pieces which thereby become pressed downwardly against their supporting skid plates and thus clamped firmly in place.

Energization of the solenoid B as described above shifts the valve 93ᵃ to admit pressure fluid to the head end of the cylinder 93 thereby retracting the rod 91 to the left (Fig. 17) and lowering the transfer shuttle 75. In this latter position, the shuttle is disengaged from the work pieces and free for retraction beneath the latter.

If, as is normally the case, all of the clamp actuator cams move through their full stroke when pressure fluid is admitted to the cylinders 140 in response to energization of the solenoid F, switches S2A associated with the individual cams will be closed and the companion switches S2 will be opened. Closure of all of the former completes an energizing circuit for the relay R3 which circuit also includes a switch S1A which is closed by the dog 162 whenever the transfer shuttle 75 is in lowered position. As indicated above, the latter normally occurs substantially simultaneously with closure of the clamp actuated switches. Energization of the relay R3 closes a switch 1R3 causing energizing of the relay R6 through a circuit extending from L1 through the relay R6, the switch 1R3 and switches S6A and S4A which are closed by dogs 167 and 169 when the cutter heads at the fourth and fifth stations are fully retracted.

Energization of the relay R6 results in closure of switches 1R6, 2R6, 3R6, 4R6 and 5R6 which initiate advance of the cutter heads at all of the work stations and prepare the other circuits necessary for causing execution of automatic cycles of the individual cutter heads. Thus, closure of the switch 1R6 energizes relay R12 through the then closed switch S4A, the latter relay in turn closing the switch 1R12. The latter switch is in a circuit extending through the relay R13 and then closed switches 2R6, S8.

Energization of the relay R13, which is locked in by closure of its switch 1R13, closes switches 173 which start the rapid traverse motor 61 and thus initiate rapid approach movement of the cutter heads 54 and 58 and retraction of the transfer shuttle 75 which moves in unison therewith. The rapid approach is terminated and movements of the heads and shuttle at feed speed are continued in response to opening of the switch S8 and closure of the switch S8A by engagement of their follower by a dog 174. The relay R13 is thus deenergized and the relay R17 is energized through switch 2R12. Switches 175 are thus closed to operate the feed motor 60. When the cutters 52, 53, and 57 have passed across the full lengths of the top, side, and end surfaces of the work pieces at station 4 and 5, a dog 176 on the head 54 opens the switch S8A thereby stopping the feed motor 60 and simultaneously closes the switch S8 thereby reenergizing the relay R13. The latter recloses the switch 173 to start the motor 61 and initiate rapid traverse of the heads 54 and 58. After the trailing end of the cutters 52 and 53 have passed beyond the work surfaces, the dog 165 opens the switch S4A thereby deenergizing the relay R6 and stopping the motor 61, the heads 54 and 58 dwelling in advanced position with the transfer shuttle 75 fully retracted. Opening of switch S4A deenergizes the relay R6 and opens the switches 1R6, 2R6, 3R6, 4R6, and 5R6 thereby allowing the relays R14, R15, and R16 to be deenergized when the switches S9, S10, and S11 are opened and prevent reenergization when they are again closed at the end of the respective cycles.

Energization of the relay R14 in response to closure of the switch 3R6 as above set forth and subsequent locking through the switch 1R14 results in closure of a switch 177 which initiates operation of the feed motor 28 to advance the cutter heads 25 for rough milling the side surfaces 11 of the work piece at station 1. Upon completion of this operation, a dog 178 on one of the heads closes the switch S9A and opens the switch S9 thereby deenergizing the feed motor relay R14 and energizing the relay R8 which closes a switch 179 for starting the rapid traverse motor 29. Rapid return of the heads 25 continues until the condition of the switches S9 and S9A is reversed by the dog 180 as the heads reach their starting position.

The motor 39 is controlled by switches 181 and 182 which are closed by relays R15 and R18 to produce feed and rapid return motions of the head 34 at station 2. The former is energized by closure of the switch 4R6 and through a switch S10 which is closed by a dog 183 in the retracted position of the head. At the end of the cutting stroke, a dog 184 opens the switch S10 and closes the companion switch to energize the relay R18 and thereby initiate rapid return of the head 34 which terminates when the dog 183 opens the switch S10A.

Energization of the relay R16 by closure of the switch 5R6 and subsequent locking thereof through its switch 1R16 closes a switch 2R16 causing energization of the solenoid G. This operates the valve 47 to admit pressure fluid to the rear ends of the cylinders 43 thereby initiating rapid advance of the boring heads 41 at the third work station. As the tools 40 reach the work, a cam 186 shifts the valve 49 to restrict the flow of fluid and reduce the speed to that desired for feeding the boring cutters through the cylinders 14. The feed motion is interrupted when a dog 187 opens the switch S11 thereby deenergizing the relay R16. At the same time, a switch S11A is closed to energize the relay R19 thereby closing a switch 1R19 in the circuit of the solenoid H. The resulting shifting of the valve 47 directs pressure fluid to the forward ends of the cylinders 43 to rapid return the heads 41 until the switch S11A is opened and the switch S11 closed by the dog 188.

By virtue of the cycle control described above, the cutter heads at the first three work stations execute independent cycles of advance and return motions. During these cycles, the cutter heads at the fourth and fifth work stations execute only an advancing movement during which the transfer shuttle 75 is returned preparatory to starting of the next cycle which must await complete return of all of the heads in machines 1, 2, and 3, and full advance of the cutter heads of machines 4 and 5. As above described, this condition is evidenced by closure of the switches S3 by the milling heads 25 and 34 and the two boring heads 41 and by closure of the switch S4 by the head 58 in its advanced position. When all of these switches become closed, everything is in readiness for starting another cycle by closure of the start switch 170. After another work piece has been placed on the work conveyor at the loading station 7, the operator may, if desired, close the start switch 170 prior to completion of the cycle. This may be done anytime subsequent to lowering of the transfer shuttle 75 which as above described causes energization of the relay R3 and closure of the switch 2R3. Thus, closure of the start switch 170 energizes the relay R1 through the switch 2R3 and the relay becomes locked in energized condition through its shunt switch IRI. It follows, therefore, that if the operator depresses the cycle start button 170 while the cutter heads are moving through their cycles, a complete circuit for the solenoid A will be established when the head movements are complete. In case the operator does not depress the cycle start button, the switch 2RI will remain open and therefore the circuit for the solenoid A is incomplete, and the machine will come to a stop with the heads 25, 34, and 41 fully returned and the heads 54 and 58 of stations 4 and 5 in their advanced position.

Operation of interlock and safety controls

The various interlock and safety controls previously described operate automatically to avoid damage to the equipment or work pieces by insuring operation of the power actuator in proper sequence and to prevent damage to or inaccurate machining of the work pieces by insuring correct positioning and clamping of the pieces before operation of any cutter thereon.

One of the safeguards results from mechanically connecting all of the dowel pins 112 together for operation in unison by the common rock shaft. Thus, blocking of any one pin by an improperly positioned work piece or a clogged dowel hole results in obstructing the dowel operator. In any such event, raising of the misplaced work piece by the power actuator for the dowels is effectually prevented by the stops previously described and formed by the clamps at the work stations 1, 2, and 5, the surface 140b on the frame of the machine 3, or the overlying bracket 54a (Fig. 12a) at the fourth station. In this way, blocking of any one dowel positively prevents movement of the dowels and their actuator through the range necessary into or to effect closure of the switch S5A which, as above described, energizes the relay R7 and in turn the solenoid F to initiate actuation of the work clamps. The whole machine line-up is thus effectually disabled until the abnormal condition has been remedied.

In proper clamping of any work piece or failure of any clamp to operate also serves to interrupt the cycle and disable the tool heads against advance toward the work. This safeguard involves the use of clamp actuators normally movable at least a definite range to effect clamping of a correctly positioned work piece and operable when moved through this range to actuate devices such as the switches S2A jointly controlling the next step of the cycle. Thus, in the event that any one of the clamp actuators fails or if any clamp fails to move through its full range due to improper positioning of a work piece, the associated switch S2A remains open thereby preventing energization of the relays R3 and R6 by which advance of the tool heads is controlled.

The entire machine line-up is also disabled in the event that a work piece becomes misplaced on the work conveyor so that it will not engage properly with the transfer bar or will not coact properly with the dowel pins in the next work station. This safeguard is provided by the work feelers 130 (Fig. 10) at the selected idle stations, together with their associated switches S7 which jointly control the circuit of the solenoid D. If any of these switches is held open due to displacement of the associated work piece laterally, longitudinally, or vertically from its normal position, energization of the solenoid D and raising of the dowel pins will be prevented thereby disabling all of the machines against continuance of the automatic cycle.

Finally, starting of a cycle under the control of the start switch 170 is conditioned upon all of the cutter heads at the first three stations being fully retracted and the heads at the last two stations being fully advanced. This is accomplished by interposing the switches S3 and the switch S4 in the circuit for the solenoid A and providing for holding these switches open until the heads by which they are respectively closed have reached the positions above referred to.

Manual control of individual functions

Under some conditions, it is desirable to perform certain parts of the cycle independently and under manual control. This is accomplished by disabling the automatic control devices previously described and for energizing the solenoids or relays which control selected individual functions. To this end, the switch 171 is opened and a companion switch 190 (Fig. 18) is closed thereby connecting the power line L2 to the line L3. The latter is connected through conductors and normally open push button switches 191 to 197 with the solenoids F, B, E, C, the relays RI and R9, and the solenoid D respectively. The solenoids and relays, when energized by selective manual closure of the corresponding switches, operate in the manner previously described to effect clamping of the work pieces, lowering of the transfer shuttle, unclamping, lowering of the dowel pins, raising of the transfer shuttle, advance of the transfer shuttle, and raising of the dowels. Restoration of the automatic control is effected by reclosure of the switch 171.

As used herein, the term "work piece" contemplates and includes not only the piece to be machined but any parts which may be attached to or associated with such piece and movable therewith to facilitate handling or location of the piece in the different operating stations.

We claim as our invention:

1. In a machine tool organization, the combination of an elongated horizontal work support and a power actuated transfer mechanism associated with work pieces in rest positions spaced along said support and operable during its advancing stroke to move each work piece to the next rest position, said mechanism comprising an elongated rack bar, a member mounted thereon for association with a work piece at one of said positions and for angular movement relative to the bar while engaging the work piece, a second rack bar extending along and movable relative to said first bar and connected to said member, a pair of gears of different sizes meshing with the respective rack bars and connected for rotation in unison, a power actuator for reciprocating one of said bars, the ratio between said gears being such that said member is turned through a predetermined angle during movement of said first bar a distance corresponding to the spacing of said positions.

2. In a machine tool organization, an elongated horizontal work support, a power actuated transfer mechanism adapted for operative association with work pieces in rest positions spaced along said support, said mechanism comprising an elongated bar, a member mounted thereon for operative association with a work piece at one of said positions and for angular movement relative to the bar while associated with the work piece, a second bar extending along and movable relative to said first bar and connected to said member, and power actuated mechanism for actuating said bars differentially whereby to advance the work pieces along said support and simultaneously turn the work piece engaged by said member.

3. In a machine tool organization, the combination of an elongated work support and a power actuated transfer mechanism engageable with work pieces in rest positions spaced along said support and operable during its advancing stroke to move each work piece to the next rest position, said mechanism including means engageable with a work piece at one of said positions and operable automatically as an incident to advance of the work pieces by said mechanism to turn such work piece through a predetermined angle relative to said work support, and a metal-removing tool positioned for operative engagement with the work piece after turning of the latter.

4. A machine tool organization having, in combination, a plurality of spaced work stations separated by a plurality of idle stations, power actuated cutters operable to perform metal-removing operations on work pieces while the latter are held in said work stations, a transfer member extending through said stations and adapted when moved endwise to advance a work piece from each of said stations to the next, and means operable automatically during transfer of each work piece from one of said idle stations to the next to turn the work piece through a predetermined angle and thereby position a certain portion thereof for engagement by the cutter at the next work station.

5. A machine tool organization having, in combination, a plurality of spaced work stations, power actuated cutters operable to perform metal-removing operations on the work pieces while the latter are held in said stations, transfer mechanism operable intermittently to advance a plurality of work pieces along a predetermined path through said stations whereby each work piece is moved step-by-step through the successive stations, and means operable automatically during the transfer of each work piece between two adjacent stations to change the position of the work piece relative to said transfer mechanism and said cutters.

6. A machine tool organization having, in combination, a plurality of spaced work stations, power actuated cutters operable to perform metal-removing operations on the work pieces while the latter are held in said stations, transfer mechanism operable intermittently to advance a plurality of work pieces along a predetermined path through said stations whereby each work piece is moved step-by-step through the successive stations, and mechanism operable by power derived from the movement of said transfer mechanism and while the work piece is disposed between adjacent work stations to change the position of each work piece relative to the transfer mechanism.

7. In a machine tool organization, the combination of an elongated horizontal work support and a power actuated transfer mechanism engageable with work pieces in rest positions spaced along said support and operable during its advancing stroke to move each work piece to the next rest position, said mechanism including a member engageable with a work piece at one of said positions and mounted to move bodily with the mechanism and also to turn about a vertical axis, power actuated means for turning said member through a predetermined angle about said axis during advance of said mechanism, and a metal-removing tool adapted for engagement with the turned work piece.

8. In a machine tool organization for performing metal-removing operations on a work piece, the combination of an elongated horizontal work support and a power actuated transfer mechanism engageable with work pieces in rest positions spaced along said support and operable during its advancing stroke to move each work piece to the next rest position, said mechanism including a member engageable with a work piece at one of said positions and mounted to move bodily with the mechanism and also to turn about a vertical axis, means operable during the advance of said mechanism through a distance equal to the spacing of said positions to turn said member and the work piece engaged thereby through a quarter revolution about said axis, and a metal-removing tool adapted for engagement with the work piece after turning thereof.

9. A machine tool organization having, in combination, a plurality of spaced work stations, power actuated cutters simultaneously operable to perform metal-removing operations on work pieces at the different stations, power actuated clamps for holding the work pieces in said stations, dowel members movable into engagement with the work pieces at the different stations to effect final accurate positioning of the work pieces therein, a power actuator mechanically connected to each of said dowel members and adapted when actuated to project the members simultaneously into engagement with the work pieces, means positively acting on the work pieces at the different stations to limit movement of a work piece in the direction of dowel movement in the event that such work piece is positioned to block normal entry of its dowel member, and means operable in response to final movement of said actuator after normal entry of said dowel members to initiate actuation of said clamps.

10. A machine tool organization having, in combination, a line of spaced work stations, power actuated cutters simultaneously operable to perform metal-removing operations on work pieces at the different stations, mechanically interconnected dowel members movable into engagement with the work pieces at the respective stations to effect final accurate positioning of the work pieces therein, a common actuator for said dowel members operable to project all of the members simultaneously toward the associated work pieces, and stops associated with the different work pieces and acting positively thereon to limit movement of a work piece by its associated dowel member to a range substantially less than the normal range of movement of the dowels by said actuator.

11. A machine tool organization having, in combination, a line of spaced work stations, power actuated cutters simultaneously operable to perform metal-removing operations on work pieces at the different stations, mechanically interconnected dowel members movable into engagement with the work pieces at the respective stations to effect final accurate positioning of the work pieces therein, a common actuator for said dowel members operable to project all of the members simultaneously toward the associated work pieces, stops associated with the different work pieces and acting positively thereon to limit movement of a work piece by its associated dowel member to a range substantially less than the normal range of movement of the dowels by said actuator, and means operating automatically to disable said cutters against operation on the work pieces until all of said dowel members have fully engaged the associated work pieces.

12. A machine tool organization having in combination, a work support, a clamp for holding a work piece on said support, a power actuated tool support carrying a cutter for performing a metal-removing operation on a clamped work piece, a dowel member movable into engagement with the work piece on said work support to effect final accurate positioning of the work piece laterally of the support, a power actuator for projecting said dowel member into engagement with the work piece, positively acting means to block the work piece against movement by the dowel member during actuation thereof when the work piece is positioned to block normal entry of the dowel member, and means operable to disable said clamp against effective engagement with the work piece until said actuator has moved through a distance sufficient to effect full engagement of the dowel member and work piece.

13. A machine tool organization having, in combination, a plurality of spaced work stations, power actuated cutters simultaneously operable to perform metal-removing operations on work pieces at the different stations, power actuated clamps for holding the work pieces in said stations, dowel members movable into engagement with the work pieces at the different stations to effect final accurate positioning of the work pieces therein, a common actuator for said dowel members mechanically connecting all of the members for movement in unison, and means operable in response to final movement of said actuator in a direction to enter said dowel members to initiate actuation of said clamps.

14. A machine tool organization having, in combination, a plurality of spaced work stations, power actuated cutters simultaneously operable to perform metal-removing operations on the work pieces at the different stations, clamps for holding the work pieces in said stations, dowel members movable into engagement with the work pieces at the different stations to effect final accurate positioning of the work pieces therein, an actuator mechanically connected to each of said dowel members and adapted when actuated to project the members simultaneously into engagement with the work pieces to effect final accurate positioning thereof, and means for disabling all of said clamps against effective operation until all of said dowel members have fully engaged the respective work pieces.

15. A machine tool organization having, in combination, a line of spaced power actuated machines, cutters associated with said machines and simultaneously operable to perform metal-removing operations on the different work pieces, mechanically interconnected dowel members movable into engagement with the work pieces in the different machines to effect final accurate positioning of the work pieces therein, a common actuator for said dowel members operable to project all of the members in unison toward the associated work pieces, and means responsive to final movement of all of said dowel members to control the subsequent functioning of all of said machines.

16. A machine tool organization having, in combination, a line of spaced work stations, metal-removing tools each reciprocable forwardly and backwardly and operable during forward movement to machine a work piece at one of said stations, a transfer member extending along said line for association with the work pieces in the different stations and operable during movement in one direction to simultaneously advance a machined work piece out of each station and a new work piece into the station, and a common power driven actuator for returning one of said tools and advancing said member in unison.

17. A machine tool organization having, in combination, a line of spaced work stations, metal-removing tools at the different stations, individual power actuators at the different stations for feeding said tools relative to the work pieces in the stations and for returning the tools, a transfer member reciprocable back and forth along said line for association with the work pieces in the different stations and operable during the advancing movement to simultaneously move a machined work piece out of each station and a new work piece into the station, and mechanism driven by one of said actuators for advancing and retracting said member in synchronism with the return and feeding strokes respectively of one of said tools.

18. A machine tool organization having, in combination, a line of spaced work stations, a transfer member extending along said line for association with the work pieces in the different stations and operable during movement in one direction to simultaneously advance the machined work piece out of each station and a new work piece into the station, metal-removing tools at the different stations, individual power actuators at the different stations for advancing said tools into and returning the same out of engagement with the work pieces while the latter are held in the stations, the tools at one of said stations moving parallel to the direction of transfer of the work pieces, and power driven mechanism for advancing said member in unison with the return movement of the tool at said one station.

19. A machine tool organization having, in combination, a line of spaced work stations, metal-removing tools at the different stations, individual power actuators at the different stations for advancing said tools into and returning the same out of engagement with the work pieces in the stations, a transfer member extending along said line for association with the work pieces in the different stations and operable during movement in one direction to simultaneously advance a machined work piece out of each station and a new work piece thereto, and a motion-transmitting connection between said member and one of said tool actuators operable during return movement of one of said tools to advance said member and the work pieces associated therewith.

20. A machine tool organization having, in combination, a stationary work support, a tool support reciprocable forwardly and backwardly, a tool on said tool support operable during said forward movement to machine the surface of a work piece on said support, a transfer member reciprocable forwardly and backwardly in the direction of movement of said tool support and operable during its forward movement to move one work piece onto said work support and a machined work piece off from the support, and a common power actuator operable to move said tool support forwardly and said transfer member backwardly and then simultaneously move the tool support backwardly and the transfer member forwardly.

21. A machine tool organization having, in combination, a stationary work support, a tool support reciprocable in forward and return movements, a tool on said tool support operable during said forward movement to machine a surface of a work piece fixed on said support, a transfer member movable in the direction of said return movement and parallel to said surface, and a common power driven operator for actuating said tool support and said member in unison and operable to simultaneously return said tool support and shift said member to move one work piece onto said work support and a machined work piece off from the support.

22. A machine tool organization having, in combination, a stationary work support, a tool support reciprocable in an automatic cycle of forward feed and rapid return movements, a tool on said tool support operable during said forward movement to finish machine the surface of a work piece clamped on said support, a power actuated transfer member movable intermittently in the direction of said rapid return movement and parallel thereto and operable in unison with said rapid return movement to move one work piece onto said work support and a machined work piece off from the support at a rate such as to avoid engagement between said tool and the finished work surface.

23. A machine tool organization having, in combination, a stationary work support, a tool support reciprocable in forward and reverse return movements, a tool on said tool support operable during said forward movement to machine a surface of a work piece clamped on said support, a transfer member movable in the direction of said return movement and parallel to said surface and operable to move one work piece onto and a machined work piece off from said work support, and power driven mechanism operable to return said tool support and advance said transfer member in unison so as to maintain said tool out of engagement with the machined work surface.

24. A machine tool organization having, in combination, a work support, a reciprocable tool support carrying a tool operable during advancing movement of the support to perform a metal-removing operation on a work piece mounted on said tool support, power driven mechanism for imparting feed and rapid return movements to said tool support, a transfer member reciprocable along said work support and operable during its forward stroke to move a machined work piece off from said support and advance a new work piece thereon, a motion transmitting connection between said member and said mechanism for advancing and retracting said member respectively during return and forward movements of said tool support, and means controlling the operation of said mechanism to cause rapid movement of said tool support during the major portion of its return stroke and a final movement at a slower feed rate whereby to facilitate accurate positioning of the new work piece on said work support.

25. A machine tool organization having, in combination, a work support, a power reciprocated tool support carrying a tool operable for performing a metal-removing operation on a work piece mounted on said tool support, a reciprocable transfer member operable during its forward stroke to move a machined work piece off from said support and advance a new work piece thereon, a power driven actuator for said member operable to advance the latter at a relatively rapid rate during the major portion of its active stroke and then at a slow rate during final movement whereby to increase the accuracy with which the new work piece may be positioned on said work support.

26. A machine tool organization having, in combination, a line of spaced work stations, a work slideway extending therethrough, tools at the different stations movable relative to the work piece therein to perform metal-removing operations thereon, a support extending along said line and mounted beneath the work pieces at said stations for vertical movement, a transfer member extending through the stations of said line and mounted on said support for endwise reciprocation, and groups of surfaces formed on said member at points spaced longitudinally therealong with the surfaces of each group spaced both longitudinally and laterally of the member and operatively associated with a work piece when the member is raised by said support whereby to couple each work piece and the member against relative movement, said member when moved in one direction with the work pieces coupled thereto operating to move a work piece out of the station and a preceding work piece thereto.

27. A machine tool organization having, in combination, a line of spaced work stations, a work support extending therethrough, metal-removing tools at the different stations, individual power actuators at the different stations for feeding said tools relative to the work pieces therein, and a transfer member extending through the stations of said line beneath the work pieces on said support and mounted for endwise reciprocation and also for bodily vertical movement, said member when raised engaging each work piece and acting to hold all parts of the same positively against movement both laterally or longitudinally of said member.

28. A machine tool organization having, in combination, a line of spaced work stations, a work support extending therethrough, metal-removing tools at the different stations, individual power actuators at the different stations for feeding said tools relative to the work pieces therein, and a transfer member extending through the stations of said line and mounted for bodily vertical movement into and out of engagement with the work pieces on said support, said member being engageable with each work piece at points spaced both longitudinally and laterally of the member whereby to couple the work pieces and member against relative movement in any direction.

29. In a machine tool organization, the combination of a horizontal work support, a transfer bar mounted beneath said support and guided for longitudinal reciprocation and also for bodily vertical movement into and out of engagement with work pieces spaced along said support, notches in said bar to receive the lower portions of the work pieces where said bar is raised and the work pieces are properly spaced longitudinally of said support, any work piece which is shifted longitudinally out of proper position on said support being raised by the bar off from the support, and a work feeler overlying a work piece on said support and operable to detect raising of the work piece off from said support or shifting of any part of the piece laterally of said support in either direction out of normal position.

30. In a machine tool organization, the combination of a horizontal work support, a transfer member mounted beneath said support and guided for longitudinal reciprocation and also for bodily vertical movement into and out of coupled engagement with work pieces disposed in predetermined positions on said support whereby the pieces coupled to the member are shifted horizontally along said support with the member, and a work feeler overlying a work piece on said support and engageable with opposite sides of a work piece on said support, said member being shifted out of normal position by engagement with a work piece any portion of which is raised above said support or shifted laterally out of normal position relative to said member.

31. A machine tool organization having, in combination, a line of metal-removing machines each having a bed, a horizontal work support on each bed comprising parallel rails spaced apart and supported by the bed to provide chip passages between and outwardly from the rails, a trough extending through said machines beneath said rails, a conveyor movable longitudinally of said trough, and chutes for deflecting the chips falling from said supports and the work pieces thereon into said trough.

32. A machine tool organization having, in combination, a bed, rails on said bed providing a horizontal work support and spaced apart to form chip passages therebetween, chip-collecting means below said support, a horizontal transfer bar disposed in said passage, rollers spaced along said passage and supporting said bar for longitudinal reciprocation to advance work pieces onto and off from said support, said bar having means thereon for engaging a work piece on said support, and power actuated means operable to raise and lower said bar into and out of engagement with a work piece on said support.

33. A machine tool organization having, in combination, a bed, rails on said bed providing a horizontal work support and spaced apart to form chip passages therebetween, chip-collecting means below said support, a horizontal transfer bar disposed in said passage and mounted for bodily vertical movement and longitudinal reciprocation in said passage, and means on said bar engageable with a work piece on said support when the bar is raised and operable to advance the engaged work piece during endwise movement of the bar.

34. A machine tool organization having, in combination, a stationary work support, a tool support having a tool thereon and movable forwardly and backwardly relative to said work support to successively machine a work piece and retract said tool, power actuated mechanism for advancing and retracting said tool support, and a transfer device deriving power from said mechanism and operating automatically simultaneously with the retracting movement of said tool support to move a machined work piece off from the work support and advance another work piece onto such support.

35. A machine tool organization having, in combination, a stationary work support, a tool support having a tool thereon and movable forwardly and backwardly relative to said work support to successively machine a work piece and retract said tool, power actuated mechanism for advancing and retracting said tool support, and mechanism operating automatically in unison with the retracting movement of said tool support to move a machined work piece off from the work support and advance another work piece onto such support.

36. A machine tool organization for rough and finish milling work pieces having a side surface of greater length than width, a plurality of operating stations spaced along a production line, mechanism for supporting a succession of said pieces in spaced relation along said line and for advancing the pieces step by step endwise along said line to present each piece successively to said stations, a power actuated cutter at one of said stations movable transversely of the line of advance of said work pieces to rough mill said surface, and a power actuated cutter at a subsequent station movable longitudinally of said line of advance and reversely thereof to finish mill said surface.

37. A machine tool organization for rough and finish milling work pieces having a side surface of greater length than width, a plurality of operating stations spaced along a production line, mechanism for supporting a succession of said pieces in spaced relation along said line and for advancing the pieces step by step endwise along said line to present each piece successively to said stations, a power actuated cutter at one of said stations movable transversely of the line of advance of said work pieces to rough mill said surface, and a power actuated cutter at a subsequent station movable longitudinally of said line of advance to finish mill said surface.

ALEXANDER OBERHOFFKEN.
JOHN M. STRACHAN.